A. ZINK.
Wagon Brake.
No. 109,097. Patented Nov. 8, 1870.
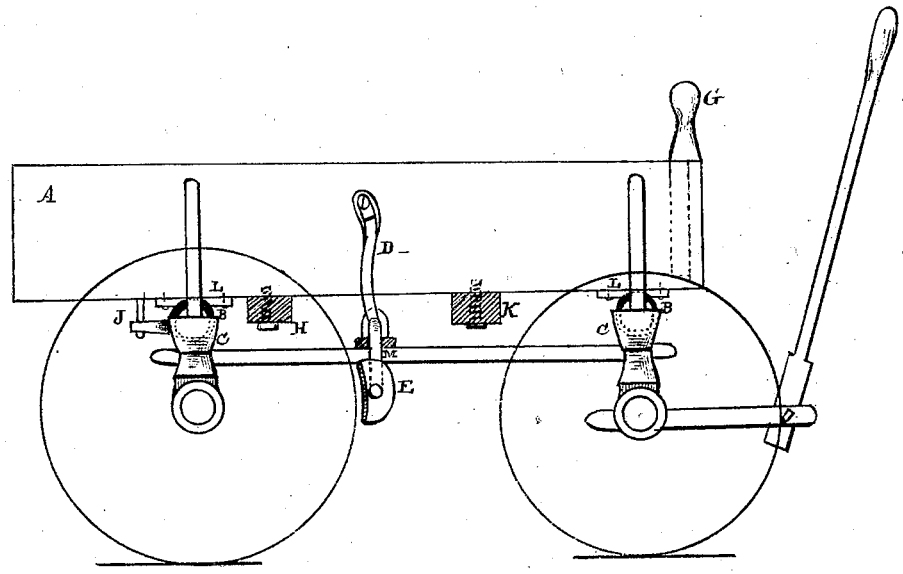
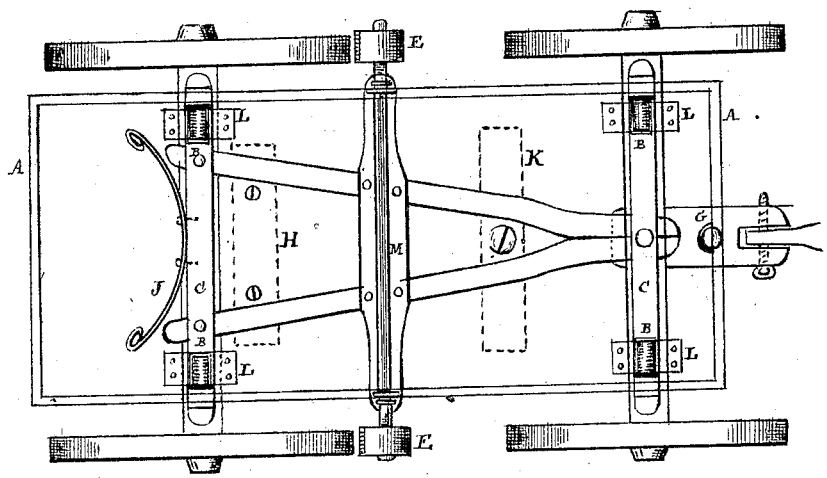

United States Patent Office.

ANTHONY ZINK, OF LANCASTER, OHIO.

Letters Patent No. 109,097, dated November 8, 1870.

IMPROVEMENT IN SELF-ACTING WAGON-BRAKES.

The Schedule referred to in these Letters Patent and making part of the same.

*To all whom it may concern:*

Be it known that I, ANTHONY ZINK, of Lancaster, Fairfield county, State of Ohio, have invented an "Improved Self-acting Brake for Locking Wagons;" and I do hereby declare the following to be an exact description thereof, reference being had to the accompanying drawing and to the letters of reference marked thereon, making a part of this specification, in which—

Figure 1 is a side elevation of the wagon; and

Figure 2 represents a top view of the same.

The nature of my invention consists in the arrangement of the friction-rollers between the bolsters and bed of the wagon; the construction of the self-acting pivoted levers and brakes at the sides of the wagon; the front post; check or cross-brace of the bed; and the elliptic spring in the rear of the bed.

To enable others skilled in the art to make and use my invention, I will proceed to describe it as follows:

A represents the wagon-body, or commonly called bed of the wagon.

B are friction-rollers, operating on the top of each bolster C.

D D are levers, at each side of the wagon, suspended by pivots to the sides, for the purpose of supporting the brakes E.

G is a front post attached to the front of the wagon-bed, for the purpose of wrapping the driving-lines around to check or stop the horses if they attempt to start off, which will instantly pull the wagon on a lock and prevent the horses from running away with it, which is of much safety and security to lumber-wagons and express-wagons.

H is a cross-beam, attached to the bottom of the wagon permanently, against which the hind bolster C rests or comes in contact with, eased by the elliptic spring J in the rear, that is fastened to the wagon-bed underneath, and to the bolster C.

Another cross-brace, K, attached to the bottom of the bed by a pivot-bolt or screw, that allows the brace K to be turned endwise, when necessary to strengthen the forward movement of the bed and check it, when the brake is operating, and to break the force of the wagon-bed when sliding back, as the wagon is moving up hill.

L L are iron plates, fastened on the bottom of the bed A near the sides, that the rollers B work against, and the flange of the roller working on the outside of the plates, so as to give a direct and regular motion to the wagon-bed as it moves forward or backward; and as it moves forward it draws the curved lever D with it, which presses the brake E against the hind wheels, and locks the wagon; but as soon as the wagon is drawn up hill, the wagon-bed rolls back on its rollers B, and the brake E is unlocked.

M is a cross-rod, that braces the brakes regularly and simultaneously against the hind wheels of the wagon.

What I claim as my invention, and desire to secure by Letters Patent, is—

1. The arrangement or the side levers D D, flanged friction-rollers B B, and semi-elliptic spring J, when combined and operating with the wagon-bed A, as herein described, and for the purposes set forth.

2. The arrangement and combination of the front post G, the under cross-brace and check H, and the rear half-elliptic spring J, with the wagon-bed A, as herein described, and for the purposes set forth.

ANTHONY ZINK.

Witnesses:
H. I. BLAIRE,
J. C. TUTHILL.